Feb. 9, 1926. 1,572,413

W. VOGT

DIRECTION INDICATOR FOR MOTOR VEHICLES

Filed Jan. 6, 1925 2 Sheets-Sheet 1

Inventor
W. Vogt
by Langner, Parry, Card & Langner
Attys.

Feb. 9, 1926. 1,572,413
W. VOGT
DIRECTION INDICATOR FOR MOTOR VEHICLES
Filed Jan. 6, 1925 2 Sheets-Sheet 2
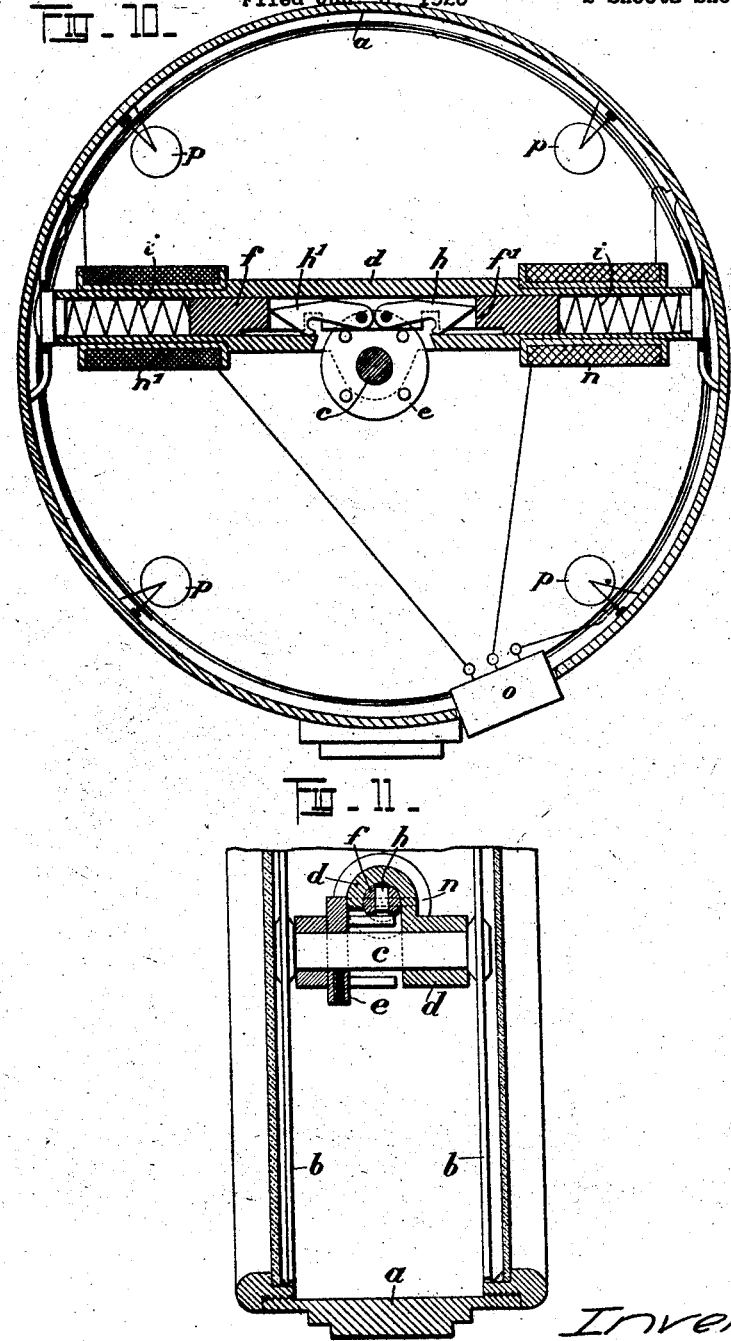
Inventor
W. Vogt
by Langner, Parry, Card & Langner
Att'ys.

Patented Feb. 9, 1926.

1,572,413

UNITED STATES PATENT OFFICE.

WILHELM VOGT, OF MELIDE, SWITZERLAND.

DIRECTION INDICATOR FOR MOTOR VEHICLES.

Application filed January 6, 1925. Serial No. 931.

*To all whom it may concern:*

Be it known that I, WILHELM VOGT, a citizen of the Republic of Switzerland, and resident of Melide, Tessin, Switzerland, have invented new and useful Improvements in Direction Indicators for Motor Vehicles, of which the following is a full, clear, and exact specification.

The present invention relates to a direction indicator for motor vehicles adapted to be illuminated, in which a pair of rotatable signal discs mounted on the vehicle so as to be visible from in front or from behind encloses an illuminating device between the discs and is controlled by a control member movable by suction or electromagnetic impulse to either side of a midposition, the control member acting upon the pair of signal discs so as to move it out of a midposition corresponding to motion straight ahead into a side position to indicate a turn to the right or to the left, by means of a shifting pawl device connected to the control member and engaging with a cooperating plate connected to the pair of signal discs so as to turn the same through a certain radial angle to the right or left, until at the instant when this plate is held stationary by a locking device, the shifting pawl device is released from the plate by a releasing member and is returned by returning means to the initial position for a fresh turn.

Preferably, the said control member comprises a wing piston capable of swinging to and fro in a closed casing, the spaces in the casing on one side or the other of this wing piston being adapted to be connected with the induction side of the vehicle motor. But it may also be constituted by a sliding piece placed under the control of alternately acting electro-magnets.

The drawings illustrate by way of example two embodiments of the object of the invention.

Figures 10 and 11 relate to the second form of construction wherein the control is obtained by electro-magnetic means.

Figure 1:
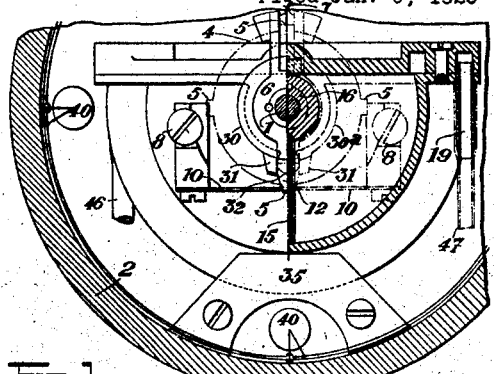
Figure 1 is a cross section taken at two different positions of one of the two constructions wherein the actuation of the control member is obtained through the suction effect of the vehicle motor.
Figure 8:
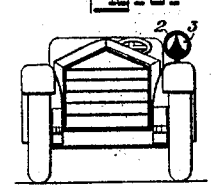
Figures 8 and 9 show the arrangement of the apparatus on a motor vehicle.
Figure 9:
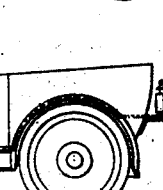

A pair of signal discs 3, 3 (Figures 1, 2 and 3) are rotatably mounted on a central shaft 1 within a casing 2 adapted to be attached to the vehicle so as to be visible both from in front and from behind. These discs are made of light transparent material, such as opalescent glass, and may carry a colored transparent arrow for indicating the direction of travel (see Figure 8), whilst between these discs 3 an electric lighting device of known type is provided. In Figure 1 for example, two incandescent lamps 40 are provided for this purpose, the arrangement and connections of which can be as desired.

The rotation of the pair of signal discs 3 to the right or left of a midposition indicating motion straight ahead, is effected by means of a plate 4 connected to them, which serves both for driving and for locking purposes and is provided with four teeth 5 on its periphery. For turning this plate 4, a catch pawl 6 is provided which is carried by a sleeve 16 rotatably mounted on the shaft 1, said catch pawl 6 being so arranged that in the initial position it grips one of the teeth 5 of the plate 4 by means of two spring arms 7 and thus carries the plate 4 with it when it rotates, until one or the other of the spring arms 7, depending on the direction of the rotary movement, passes under one or the other of two releasing heads 8 and is thus released from the plate tooth, so that the catch pawl 6 under the action of a spiral spring 9, which is tensioned by the shifting stroke of the catch pawl, can be returned to its initial position. In this initial position the catch pawl 6 again grips a tooth of the plate 4 so that it is prepared to move in either direction. The said releasing heads 8 are formed by the heads of screws against the underside of which sloping parts of the spring arms 7 strike.

The plate 4 also serves at the same time for holding the pair of signal discs 3 in their indicating position. Indeed, one of the teeth 5 of the plate, at the moment when the plate has moved the pair of signal discs into their indicating position and the catch pawl 6 is released for the return movement, springs in between two laminar locking springs 10 (Figure 1) one or other of which can be pressed back by a releasing tooth 12 integral with the catch pawl 6 so as to free the plate at the beginning of the shifting movement, so that the plate tooth, which until then has determined the locking can pass by the pressed back spring lock.

Figure 4:
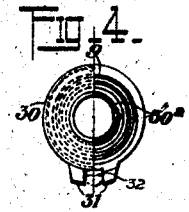
Figure 4 is a detail view.

The spiral spring 9 is enclosed between and connects together two casing halves 30, 30ª which are capable of rotation with respect to one another. This spring casing is loosely mounted on the sleeve 16. When at rest the casing halves 30, 30ª are each supported on the stationary abutment 32 by means of a tooth 31 and their teeth 31 lie within reach of the releasing tooth 12. This latter tensions the spring 9 on rotation of the driving catch pawl 6 by carrying with it the corresponding casing half by its tooth 31; Figure 4 shows on the left one casing half and on the right the other casing half.

Figure 2:
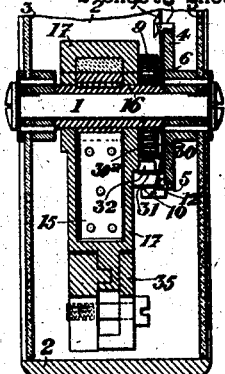
Figure 2 is an axial section thereof.
Figure 3:
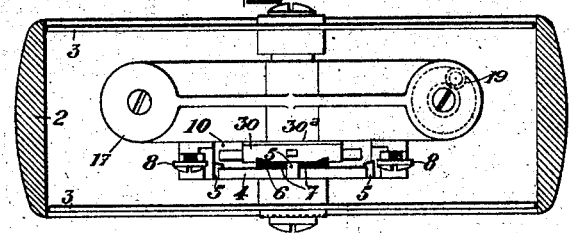
Figure 3 is a partial plan view of the same.
Figure 6:
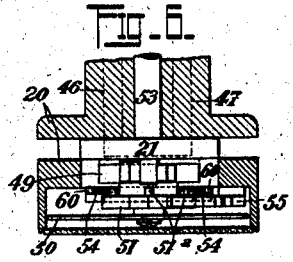
Figure 7:
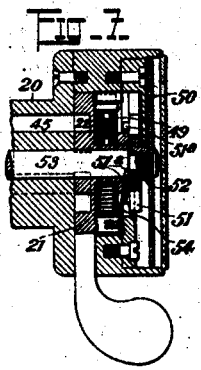

The movement of the catch pawl 6 is effected by suction by means of a wing piston 15 which is mounted with the catch pawl 6 on the sleeve 16 loose on the shaft 1 (Figure 2). This wing piston 15, which forms the control member mentioned above, is situated pressure tightly in a casing 17 which is tightly closed to the outside, and it can be swung to the right or the left out of its midposition, in which it hangs down vertically, by a suction effect produced at one side or the other of the same, taking the catch pawl with it in the same direction. For producing this suction effect the suction chambers of the casing 17, on both sides of the wing piston 15, are connected by small tubes 19 with the induction side of the motor through a distributor 20 under the control of the driver of the vehicle. The distributor 20 which is shown separately in Figures 6, 7 and 8 consists of a rotary valve 21 which on rotation in one direction or the other puts, by means of a groove 22, a pipe 45 leading to the induction side of the motor into communication either with the one or the other of two pipes 46, 47 leading respectively to the two suction chambers of the casing 17. The method of construction of this distributor can of course be varied; the essential feature is that by operating it the suction effect of the motor can be utilized on either side of the wing piston 15 in the casing 17, so as to cause the wing piston to swing correspondingly.

Figure 5:
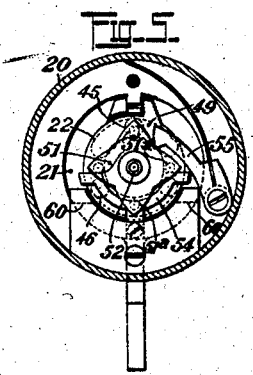
Figures 5, 6 and 7 show a manually operated suction distributor to admit the motor suction effect either on the one or on the other side of said control member.

To show the adjusted indication of the signal discs to the driver of vehicle, a miniature signal disc 50 is provided on the distributor, which is actuated by the movement of the rotary valve 21 through the medium of a ratchet-like mechanism. The rotary valve 21 is under the action of a two-part spring casing 49 similar to that above described, which tends to maintain it in the midposition. The miniature signal disc 50 is loosely mounted together with a star wheel 51 having studs 51ª, on a pin 52 of the valve axis 53 and on the rotation of the valve 21 to the right or left is shifted to the right or left, according to the shifting operation on the vehicle direction indicator, through the medium of a catch pawl 54 fastened to the valve 21, provided with two spring arms and having one of them in operative or shifting engagement with one of the studs 51ª of the star wheel, whilst the other spring arm of said catch pawl is pressed back or released by its cooperation with a releasing plate 60. This shifting motion of the miniature signal disc to the right or left continues till up to the moment when, after a rotation of approximately 45 degrees, a spring pawl 55 adapted to press upon the ogive like teeth of the star wheel suddenly shifts the latter to the end position in which the disc 50 points to the driver the adjusted direction on the vehicle direction indicator. On releasing the handle of the rotary valve 21, the latter together with the catch pawl 54 is returned by the action of the two-part spring casing 49 to the midposition represented in Figure 5, whilst the miniature signal disc 50 remains in the new indicating position. The functions are the same for the shifting in both directions and the position of the miniature signal disc 50 will thus always correspond to the position of the main signal discs 3.

For the purpose of correct setting of the parts the casing 17 is adjustable in the outer casing 2, being carried in a clamping device 35, best seen in Figure 2.

The general method of operation of the described apparatus is briefly as follows.

In the midposition of the parts the pair of signal discs indicate motion straight ahead. If it is intended to turn to the right the suction effect of the motor is caused by means of the distributor 20 to act on the corresponding side of the wing piston so that the plate 4 and with it the pair of signal discs are set by the catch pawl 6 for a turn to the right. The pair of signal discs remain in this position until by causing the induction effect of the motor to operate on the other side of the wing piston a new turning movement is applied to the plate 4 for returning the pair of signal discs into the midposition, after which by renewed operation in the same direction, the pair of signal discs can be set for indicating a turn to the left. The shifting of the pair of signal discs to the right or left therefore always starts from a midposition. From this midposition it is possible by a double shifting operation to the right or left, to move the pair of signal discs with its signal to a diametrically opposite position for example to indicate the stop of the vehicle.

With reference to Figures 10 and 11, the casing $a$ comprises the pair of signal discs $b$ supported on the rotary shaft $c$, the form of the discs being similar to that above described. The shaft $c$ is supported within the casing $a$ by a bearing member $d$ situated between the pair of discs and carries an actuating disc $e$. Above the shaft $c$ a cylindrical iron bar $f$ is movably guided in a stationary guide channel of the member $d$ at right angles to the shaft $c$, and is provided in a slot $f'$ with two pawls $h$, $h'$ facing in opposite directions, which latter are adapted to co-act alternately with the actuating disc $e$. This cylindrical bar $f$ is acted on by two springs $i$ of equal strength which tend to keep it in its mid-position and are adapted to return it thereto. Its ends form the armatures of two electro-magnets $n$, $n'$ which are in an electric circuit which can be closed from the driver's seat by means of a contact switch $o$ to energize either of the electromagnets. Inside the casing $a$ between the pair of discs $b$, $b$, are a plurality of electric incandescent lamps $p$ which are adapted to illuminate the discs from within and are to be put in at night.

The points of the pawls $h$, $h'$ are bevelled so as to allow the release thereof from the shifting disc $e$ when entering the hollow member $d$.

In the position of the parts shown in the drawing, the signal arrow points for example vertically upwards. In this way motion straight ahead is indicated. If a turn is to be made to either side, the circuit of the corresponding electromagnet, say $n$, is closed by means of the contact switch $o$ so that it draws the cylindrical bar $f$ in Figure 1 to the rigth and the pawl $h'$ turns the actuating disc $e$ with the pair of discs $b$, $b$, through a certain angle, so as to move the direction arrow to the corresponding side, after which when the electromagnet $n$ has been de-energized the compressed spring $i$ returns the cylindrical bar $f$ back into its mid-position, whilst the pair of discs $b$, $b$, remain in their new position owing to their somewhat frictional fitting or to a braking effect applied thereto. Further energizing of the electromagnet $n$ would move the pair of discs again in the same direction.

If when turning to the other side the circuit of the electromagnet $n'$ is closed, then the cylindrical bar $f$ in Figure 10 is drawn to the left and the pawl $h$ moves the pair of discs, $b$, $b$, in the opposite direction to the foregoing, so as to indicate the corresponding direction of travel. The return of the cylindrical bar is again effected by the corresponding spring $i$.

What I claim is:—

1. A direction indicator for motor vehicles, comprising a casing, two rotary transparent circular signal discs within this casing, an illuminating device between said signal discs, a shifting toothed member connected to the latter, a movable catch pawl arranged to catch said shifting member, means to release said pawl from the shifting member, one single automatically reciprocatable control member to which said catch pawl is connected and which, as well as the shifting member and the catch pawl, are located between the signal discs, means to retain the latter in their position, actuating means to automatically produce a reciprocating movement of said control member, and driver's operating means on the outside of said casing to control said actuating means.

2. A direction indicator for motor vehicles, comprising a casing, two rotary transparent signal discs within this casing, an illuminating device between said signal discs, a shifting toothed member connected to the latter, a movable catch pawl arranged to cooperate with said shifting member, a reciprocatable control member to which said catch pawl is connected and which, as well as the shifting member and the catch pawl, are located between the signal discs, locking springs to lock said toothed member in its positions, means integral with said catch pawl to release said locking springs, actuating means to automatically produce a reciprocating movement of said control member, and driver's operating means on the outside of said casing to control said actuating means.

3. A direction indicator for motor vehicles, comprising a casing, two rotary transparent signal discs within this casing, an illuminating device between said signal discs, a shifting toothed member connected to the latter, a movable catch pawl arranged to cooperate with said shifting member, a reciprocatable control member to which said catch pawl is connected and which, as well as the shifting member and the catch pawl, are located between the signal discs, means to release said catch pawl after its shifting operation, means to lock said toothed member in its adjusted position, means to automatically return said catch pawl to its initial position, actuating means to automatically produce a reciprocating movement of said control member, and driver's operating means on the outside of said casing to control said actuating means.

4. A direction indicator for motor vehicles, comprising a casing, two rotary transparent signal discs within this casing, an illuminating device between said signal discs, a shifting toothed member connected to the latter, a movable catch pawl arranged to cooperate with said shifting member, an oscillating wing piston to which said catch pawl is connected, a tightly closed casing enclosing said wing piston and located between said signal discs, a power fluid source, means to connect said casing on both sides of the wing piston with said power fluid source, and a manually operatable distributor to control said connection so as to connect either the one or the other side of said wing piston with said power fluid source.

5. A direction indicator for motor vehicles, comprising a casing, two rotary transparent signal discs within this casing, an illuminating device between said signal discs, a shifting toothed member connected to the latter, a movable catch pawl arranged to cooperate with said shifting member, an oscillating wing piston to which said catch pawl is connected, a tightly closed casing enclosing said wing piston and located between said signal discs, means to connect said casing on both sides of the wing piston to the induction side of the vehicle motor and a manually operatable distributor to control said connection so as to connect either the one or the other side of said wing piston with the induction side of said motor in order to produce motion of said wing piston.

6. A direction indicator for motor vehicles, comprising a casing, two rotary transparent signal discs within this casing, an illuminating device between said signal discs, a shifting toothed member connected to the latter, a movable catch pawl arranged to cooperate with said shifting member, an oscillating wing piston to which said catch pawl is connected, a tightly closed casing enclosing said wing piston and located between said signal discs, means to connect said casing on both sides of the wing piston to the induction side of the vehicle motor and a manually operatable distributor to control said connection so as to connect either the one or the other side of said wing piston with the induction side of said motor in order to produce motion of said wing piston, said distributor being provided with a movable miniature signal disc and means to adjust the same according to the adjustments of the main signal discs.

In testimony whereof I have hereunto signed my name this 23d day of December 1924.

WILHELM VOGT.